United States Patent
Berlin et al.

(10) Patent No.: US 6,770,105 B2
(45) Date of Patent: Aug. 3, 2004

(54) METHOD AND DEVICE FOR TREATING FUEL

(75) Inventors: Alvin J. Berlin, Gainesville, FL (US); Ralph H. Wright, Westchester (GB)

(73) Assignee: Advanced Power Systems International, Inc., Lakeville, CT (US)

( * ) Notice: Subject to any disclaimer, the term of this patent is extended or adjusted under 35 U.S.C. 154(b) by 517 days.

(21) Appl. No.: 09/938,367

(22) Filed: Aug. 24, 2001

(65) Prior Publication Data

US 2002/0139044 A1 Oct. 3, 2002

Related U.S. Application Data

(60) Division of application No. 09/460,329, filed on Dec. 10, 1999, now Pat. No. 6,306,185, which is a division of application No. 08/961,710, filed on Oct. 31, 1997, now Pat. No. 6,000,381, which is a continuation-in-part of application No. 08/757,612, filed on Nov. 29, 1996, now Pat. No. 5,738,692, which is a continuation-in-part of application No. 07/528,363, filed on May 25, 1990, now Pat. No. 5,580,359.

(51) Int. Cl.[7] .............................. C10L 1/10; F02B 51/02; F02M 27/02
(52) U.S. Cl. ................... 44/321; 123/536; 123/537; 123/538; 123/670; 420/589
(58) Field of Search ................ 44/321; 123/536, 123/537, 538, 670; 420/589

(56) References Cited

U.S. PATENT DOCUMENTS

| | | |
|---|---|---|
| 3,507,789 A | 4/1970 | Heilweil et al. ............... 252/19 |
| 3,635,200 A | 1/1972 | Rundell et al. ................. 123/3 |
| 3,855,980 A | 12/1974 | Weisz et al. .................... 123/3 |
| 3,897,225 A | 7/1975 | Henkel et al. ................. 48/107 |
| 3,944,697 A | 3/1976 | Ichimura et al. ............ 428/210 |
| 4,046,522 A | 9/1977 | Chen et al. ............... 48/102 A |
| 4,070,993 A | 1/1978 | Chen ............................. 123/3 |

(List continued on next page.)

FOREIGN PATENT DOCUMENTS

| | | |
|---|---|---|
| CA | 459592 | 9/1949 |
| EP | 0 449 244 A1 | 10/1991 |
| GB | 1079698 | 8/1987 |
| WO | WO 90/14516 | 11/1990 |

*Primary Examiner*—Jerry D. Johnson
(74) *Attorney, Agent, or Firm*—Rossi & Associates

(57) ABSTRACT

A fuel catalyst for improving combustion efficiency is provided that includes at least one hydride producing element, and at least one element of greater activity on the electrolytic scale than the hydride producing element and at least one element of lesser activity on the electrolytic scale than the hydride producing element. The hydride producing element preferably includes an element from at least one of a Group IV and Group V of the periodic table. The element of greater activity and the element of lesser activity preferably includes at least one of zinc, magnesium, aluminum, palladium, silver, copper and cerium. Preferred formulations of the catalyst element include: a) 20–60% wt antimony, 10–30% wt tin, 10–80% wt zinc and 1–5% wt silver; b) 40% wt antimony, 18 % wt tin, 40% wt zinc and 2% wt silver; c) 20–60% wt antimony, 10–30% wt tin, 20–80 % wt magnesium, 1–8% wt cerium and 0.1–1.0% wt palladium; d) 40% wt antimony, 25 % wt tin, 30% wt magnesium, 4.8% wt cerium and 0.2% wt palladium; and e) 25% wt antimony, 25% wt tin, 39% wt zinc and 11% wt aluminum.

7 Claims, 15 Drawing Sheets

U.S. PATENT DOCUMENTS

| | | | |
|---|---|---|---|
| 4,429,665 A | 2/1984 | Brown | 123/3 |
| 4,517,926 A | 5/1985 | Reinhard et al. | 123/3 |
| 4,858,582 A | 8/1989 | Brown | 123/523 |
| 4,862,836 A | 9/1989 | Chen et al. | 123/3 |
| 4,884,531 A | 12/1989 | Degnan, Jr. et al. | 123/3 |
| 4,891,050 A | 1/1990 | Bowers et al. | 44/67 |
| 4,892,562 A | 1/1990 | Bowers et al. | 44/67 |
| 4,930,483 A | 6/1990 | Jones | 123/538 |
| 5,019,336 A * | 5/1991 | Liebermann et al. | 420/557 |
| 5,048,499 A | 9/1991 | Daywalt | 123/538 |
| 5,059,217 A | 10/1991 | Arroyo et al. | 44/639 |
| 5,154,153 A | 10/1992 | MacGregor | 123/538 |
| 5,167,782 A | 12/1992 | Marlow | 204/168 |
| 5,197,446 A | 3/1993 | Daywalt et al. | 123/538 |
| 5,249,552 A | 10/1993 | Brooks | 123/1 |
| 5,393,723 A | 2/1995 | Finkl | 502/341 |
| 5,524,594 A | 6/1996 | D'Alessandro | 123/538 |
| 5,625,118 A | 4/1997 | Finkl | 585/899 |
| 5,728,913 A | 3/1998 | Finkl | 585/899 |
| 6,024,073 A | 2/2000 | Butt | 123/538 |
| 6,129,774 A | 10/2000 | Owens | 44/629 |

\* cited by examiner

US 6,770,105 B2

METHOD AND DEVICE FOR TREATING FUEL

CROSS-REFERENCE TO RELATED APPLICATIONS

This application is a divisional application and claims priority from U.S. patent application Ser. No. 09/460,329 filed on Dec. 10, 1999, now U.S. Pat. No. 6,306,185 which in turn is a divisional application of 08/961,710 filed on Oct. 31, 1997 now U.S. Pat. No. 6,000,381, which in turn is a continuation-in-part of 08/757,612 filed Nov. 29, 1996 now U.S. Pat. No. 5,738,692, which in turn is a continuation-in-part of 07/528,363 filed May 25, 1990 now U.S. Pat. No. 5,580,359.

FIELD OF THE INVENTION

The present invention relates in general to methods and devices for treating fuels prior to combustion in order to increase combustion efficiency and thereby reduce exhaust emissions.

BACKGROUND OF THE INVENTION

It has long been an objective of many individuals within different industries to develop devices and methods for improving the combustion efficiency of hydrocarbon fuel burning systems. A major breakthrough in improving fuel efficiency was the development of a fuel catalyst described in U.S. Pat. No. 5,580,359 that could be used to treat fuel prior to combustion. While the fuel catalyst has proven to be effective, the underlying mechanism of operation has not been previously understood. It is therefore an object of the present invention to determine the underlying mechanism of operation of the fuel catalyst so that additional catalysts can be analytically developed.

SUMMARY OF THE INVENTION

The invention is based on the discovery of what is believed to be the underlying mechanism that causes a fuel catalyst to improve combustion efficiency due to the liberation of hydrogen from fuel. Based on the discovery of the underlying mechanism, it is possible to analytically determine formulations of new fuel catalyst elements. In a preferred embodiment, a fuel catalyst for improving combustion efficiency is provided that includes at least one hydride producing element, and at least one element of greater activity on the electrolytic scale than the hydride producing element and at least one element of lesser activity on the electrolytic scale than the hydride producing element. The hydride producing element preferably includes an element from at least one of a Group IV and Group V of the periodic table. The element of greater activity and the element of lesser activity preferably includes at least one of zinc, magnesium, aluminum, palladium, silver, copper and cerium. Preferred formulations of the catalyst element include: a) 20–60% wt antimony, 10–30% wt tin, 10–80% wt zinc and 1–5% wt silver; b) 40% wt antimony, 18% wt tin, 40% wt zinc and 2% wt silver; c) 20–60% wt antimony, 10–30% wt tin, 20–80% wt magnesium, 1–8% wt cerium and 0.1–1.0% wt palladium; d) 40% wt antimony, 25% wt tin, 30% wt magnesium, 4.8% wt cerium and 0.2% wt palladium; and e) 25% wt antimony, 25% wt tin, 39% wt zinc and 11% wt aluminum. Various mechanisms may be used to bring fuel into contact with the fuel catalyst element including in-line housings, drop-in housings, coated fuel lines and placing the fuel catalyst within fuel tanks among others.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

Figure 1:
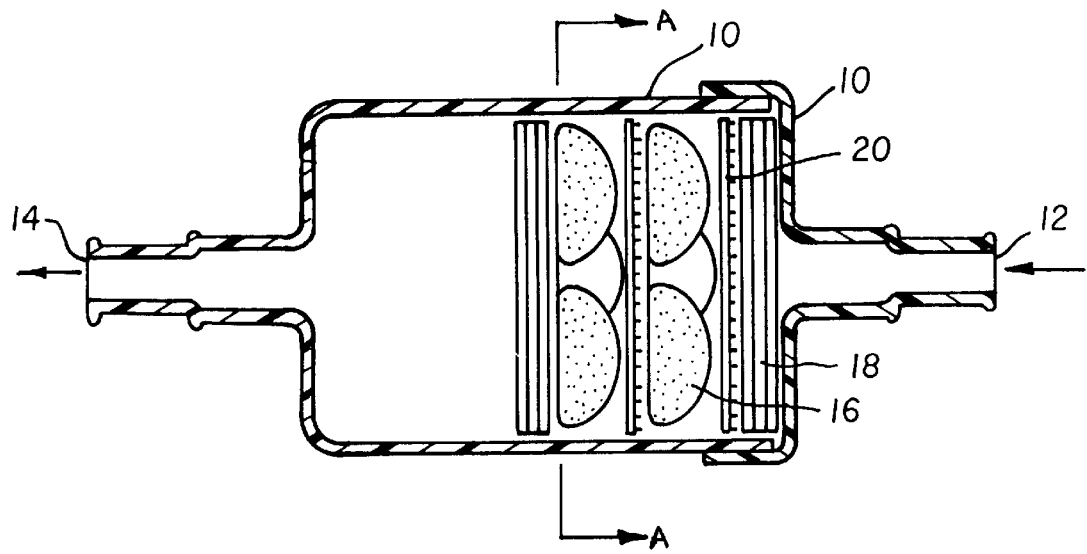
FIG. 1 is a longitudinal section through a fuel treatment device incorporating a fuel catalyst in accordance with the invention.
Figure 2:
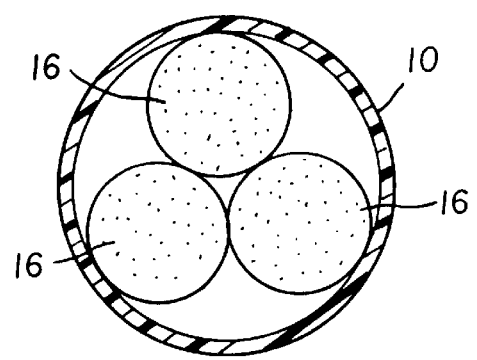
FIG. 2 is a cross-sectional view through the device of FIG. 1 taken along line A—A.

The fuel catalyst described in U.S. Pat. No. 5,580,359 functions well in a variety of fuels to increase combustion efficiency, reduce exhaust gas pollutants and particulates, and increase power. The fuel catalyst can be easily incorporated into a fuel treatment device that treats fuel as it is supplied to an engine, furnace or boiler. FIG. 1, for example, illustrates a fuel treatment device comprising a cylindrical two-part in-line housing or container 10 including a fuel flow inlet 12 and a fuel flow outlet 14. The container 10 can be manufactured from a plastic material, metal, composites and other synthetic materials. In the embodiment illustrated in FIG. 1, a plurality of catalyst elements 16 are located within the container 10 and are arranged in two sets of three elements as illustrated in FIG. 2. The catalyst elements 16 are located between element spacers 18 and mild steel mesh disks 20. The element spacers 18 are preferably plastic disks with perforations that permit, as with the steel mesh disks 20, the passage of fuel from the fuel flow inlet 12 to the fuel flow outlet 14, during which time the fuel comes into contact with the elements 16. If the container 10 is made from mild steel, it is not necessary to include separate mild steel mesh disks 20.

As described in U.S. Pat. No. 5,580,359, the elements 16 preferably include, apart from impurities, 60 to 80% wt tin, 15 to 30% wt antimony, 2 to 7% wt lead, and 3 to 12% wt mercury, and may be formed by casting, extruding, cutting or shaping to have any desired configuration. In the illustrated embodiment, the elements 16 have a base diameter of approximately 20 mm. Although six elements are illustrated, the particular number required naturally depends upon the desired application and implementation of the fuel treatment device. Further, altering the number of elements 16 will naturally change the number of element spacers 18 and steel mesh disks 20 employed in the device. A catalytic reaction takes place between the fuel and the elements 16 as the fuel passes through the container 10, which causes an improvement in the combustion of the fuel when burned.

In a further embodiment, the elements 16 are composed of a composition of 70 to 75% wt tin, 15 to 25% wt antimony, 2 to 4% wt lead and 3 to 7% wt mercury and are manufactured by the following method:

a) tin, antimony and lead are melted together in a mild steel pot to approximately 50 degrees Celsius above the melting temperature and the resultant material is stirred for three to four minutes using a mild steel rod or bar;

b) mercury is added and the temperature is increased a further 50 to 100 degrees Celsius, with the resultant material being stirred for a further two minutes;

c) the molten material is poured, by use of a mild or stainless steel ladle, into molds (of the desired element shape) in a mold block, which is formed of mild steel and is pre-heated to a temperature sufficient to prevent the material from solidifying in less than one second after pouring.

It should be noted that mis-cast elements, or any of the formulation allowed to solidify in the melting pot, may be remelted and re-cast provided that the total time lapse after the addition of the mercury does not exceed 45 minutes.

In a still further embodiment, the elements 16 may be made from an alloy that is approximately 75% wt tin, 21% wt antimony and 4% wt lead, wherein 0.5 kg of mercury and 0.020 kg platinum is added to 5.0 kg of the alloy.

Empirical evidence has demonstrated that the fuel catalyst improves the combustion process in diesel, gasoline, alcohol (both methanol and ethanol), and heating oil. Testing conducted by the Advanced Propulsion Technology Center, Oak Ridge National Laboratory, for example, confirmed that treatment of fuel with the elements 16 changed the composition of fuel, in the direction of higher octane, higher energy fuel constituents, for gasoline, Indolene and diesel. The method of analysis chosen was gas chromatography followed by mass spectrometric detection (GC/MS). GC/MS is capable of determining the chemical composition of complex mixtures of organic compounds such as fuels. Testing was conducted using catalyst packs containing 3.5 inch diameter elements, of the type described above, in a polyethylene cage. Two 250 ml samples each of diesel fuel, gasoline (unleaded, 87 octane), and Indolene (a research gasoline) were placed in pre-cleaned, amber glass bottles fitted with Teflon (tm) lined caps. An element pack was placed in one jar of each type of fuel, shaken for one minute, and left to stand for 12 hours. A 25 ml aliquot of each fuel, treated and untreated was then taken and put into precleaned 40 ml headspace sampling vials and provided for GC/MS analysis. The GC/MS analysis consisted of a 0.5 ml sample from the headspace of each vial (i.e. a sample of the vapors above the fuel in the vial). A splitless injection was made of each sample onto a 60 m DB-624 capillary column, cryogenically cooled inside a Hewlett-Packard (HP) 5890 Series 11 GC to 0 degrees Celsius. The GC run conditions were 0 Celsius for 10 min., then 0–250 Celsius at 3 C./min, which resulted in excellent separation of the components. Detection was accomplished with an HP 5971 MSD, controlled by HP Chemstation software.

Figure 3:
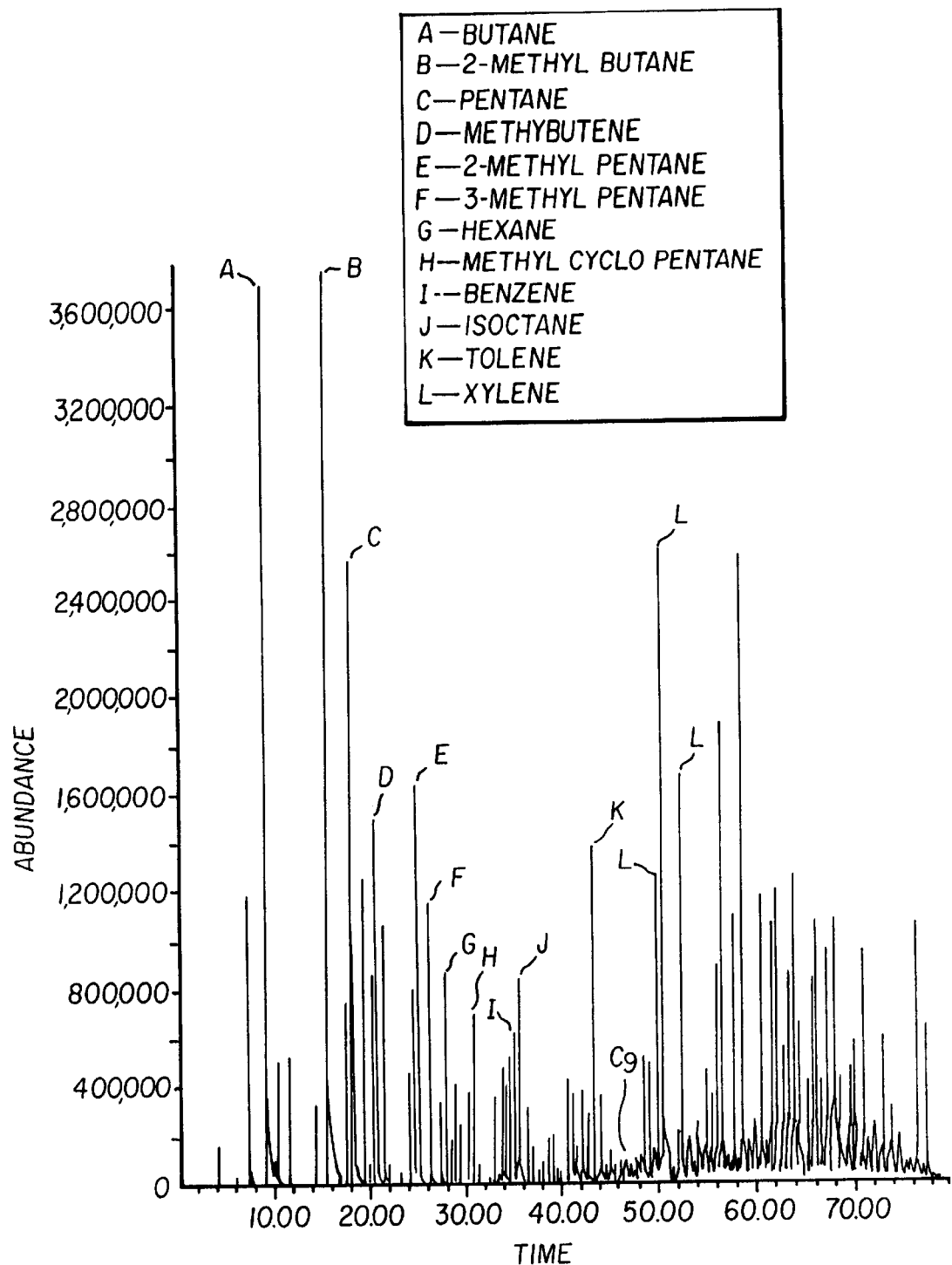
FIG. 3 is an ion chromatogram illustrating gasoline treatment with the fuel catalyst of the invention.

The six reconstructed ion chromatograms for the treated and untreated gasoline, Indolene, and diesel fuels, respectively, are shown in FIGS. 3–8. Detailed data analysis was performed using the Chemstation software. The results of these experiments show major changes occurred in the fuel samples. Cursory comparison of the untreated and treated fuels in FIGS. 3–8 show that the elements changed the amounts of individual components in the fuel samples by large amounts. As shown in FIG. 3, the treated gasoline, shows many more large peaks eluting between 40 and 80 minutes of the run, in comparison to the untreated gasoline in FIG. 4. It should be noted that concentration is proportional to peak height in the figures. When peaks could be identified, based on their mass spectrum, their identity has been indicated next to the peak. As an example, the three peaks in FIG. 4 between 50 and 51.2 minutes are identified as the three isomers of xylene. The peaks range in height from about 200,000 to 500,000 units. In FIG. 3, the same isomers of xylene range in height from 1,200,000 to 2,500,000, an increase of approximately five-fold in concentration. Similar changes in peak height are observed for the diesel fuel and the Indolene.

Figure 4:
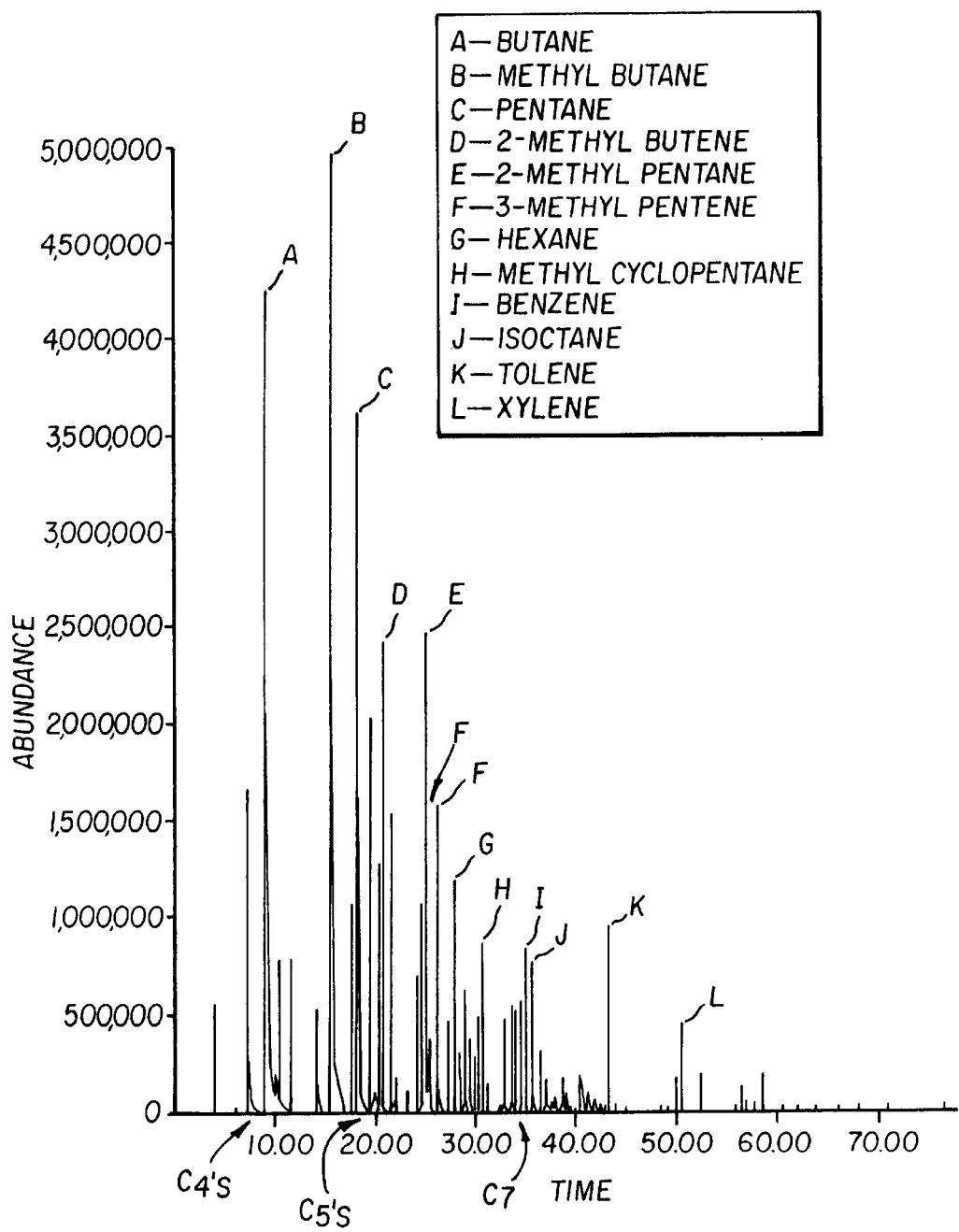
FIG. 4 is an ion chromatogram of untreated gasoline.
Figure 5:
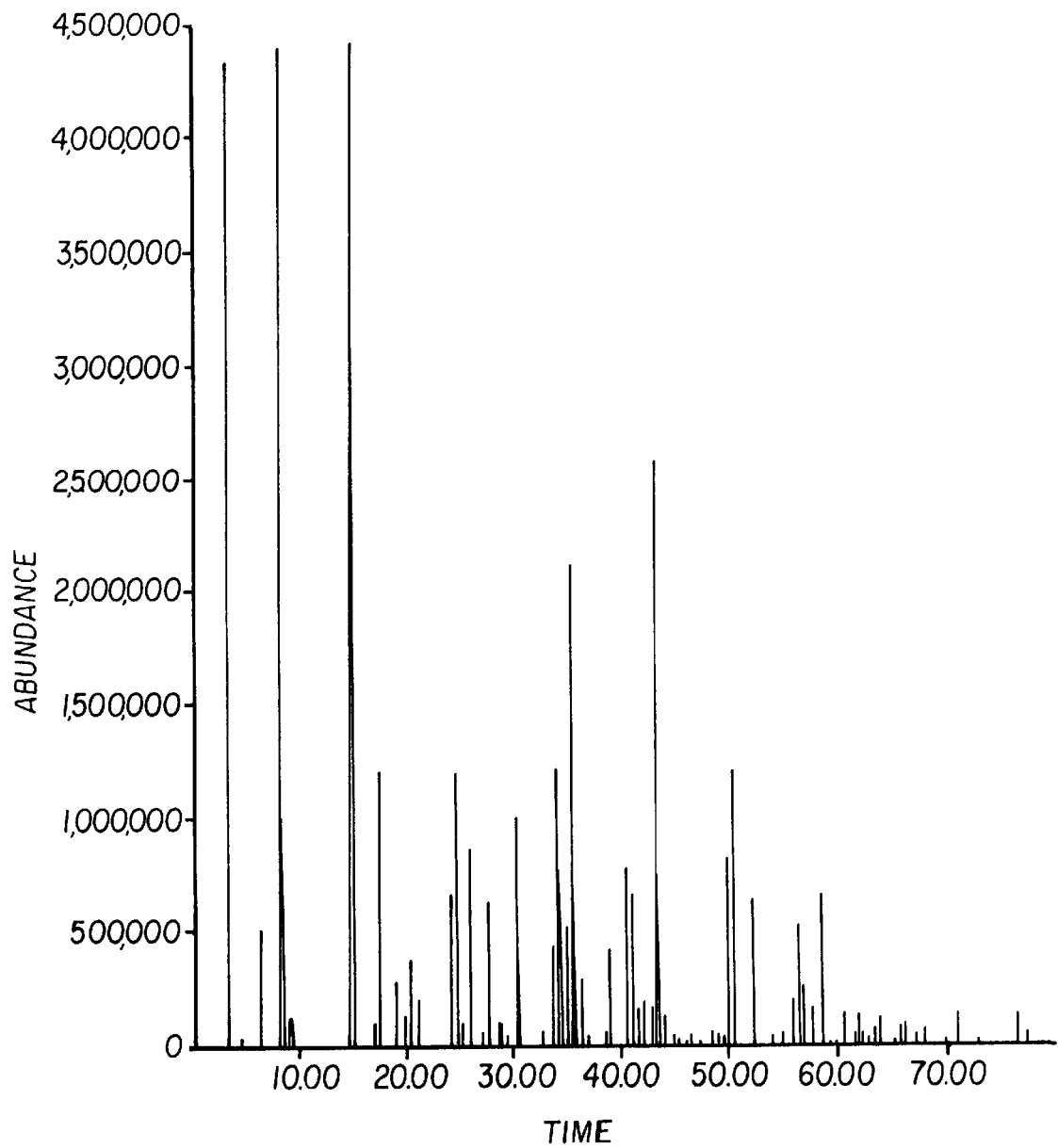
FIG. 5 is an ion chromatogram illustrating Indolene treated with the fuel catalyst of the invention.
Figure 6:
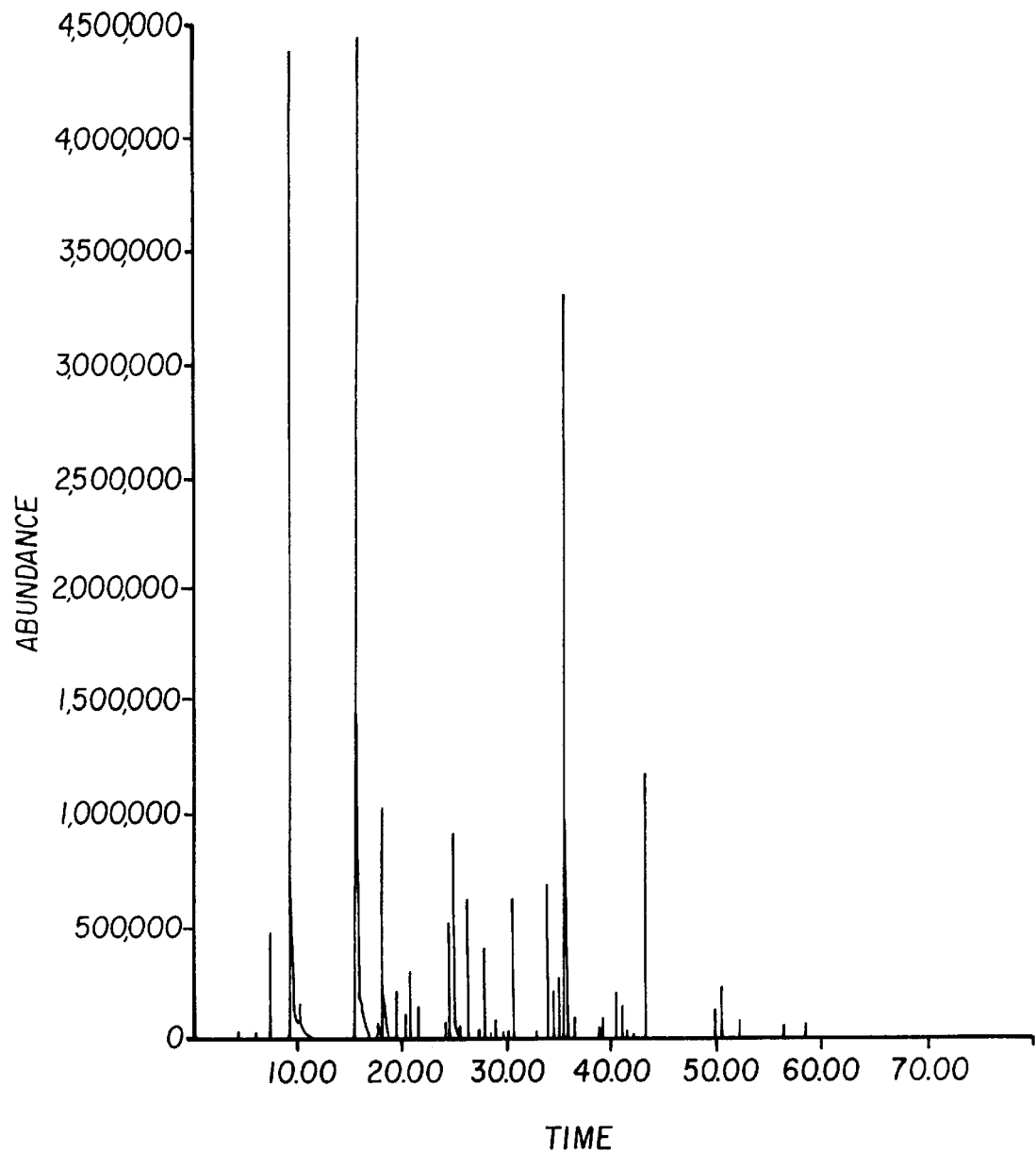
FIG. 6 is an ion chromatogram of untreated Indolene.
Figure 11:
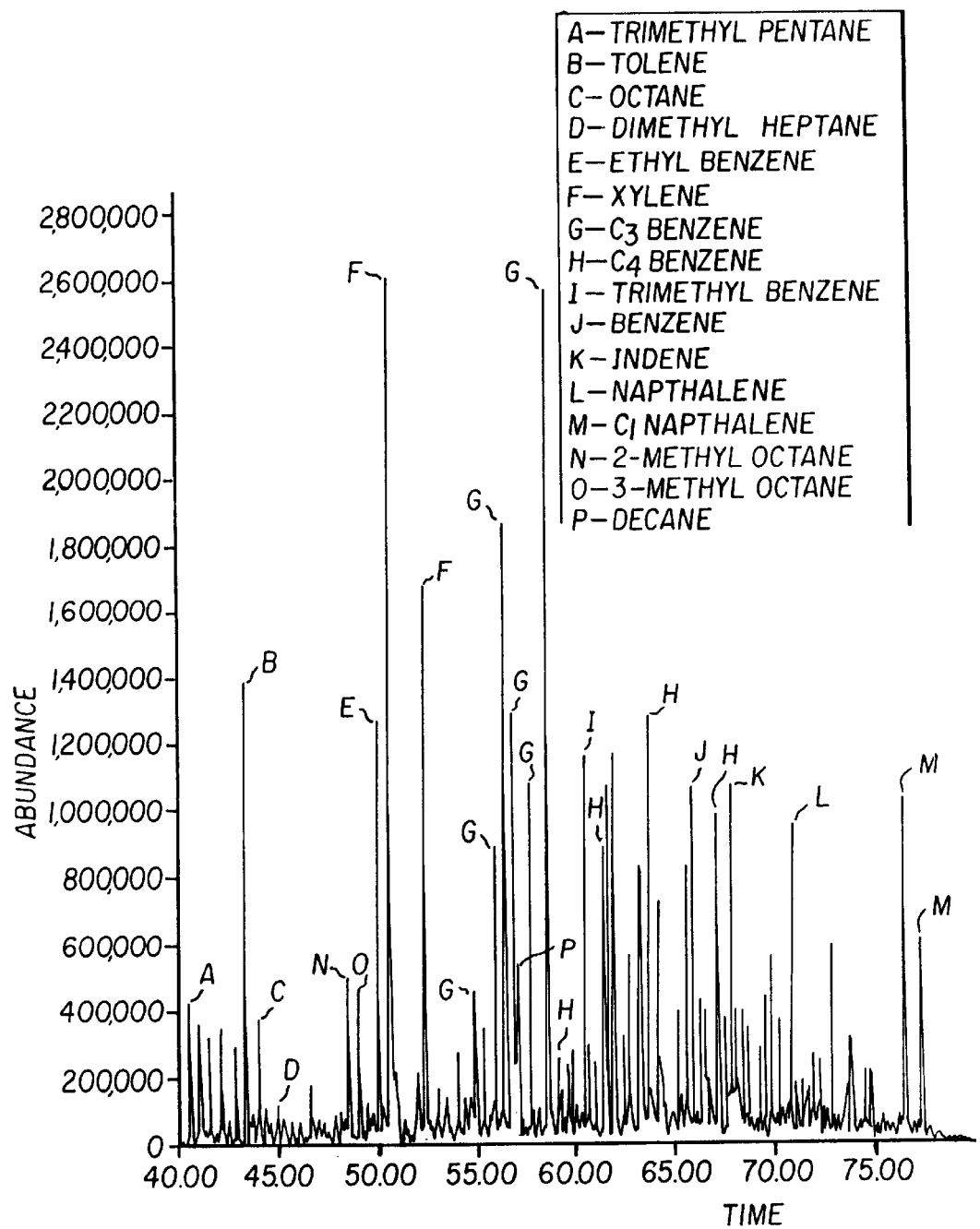
FIG. 11 illustrates an annotated chromatogram of the 40–80 minute portion of FIG. 10.
Figure 12A:
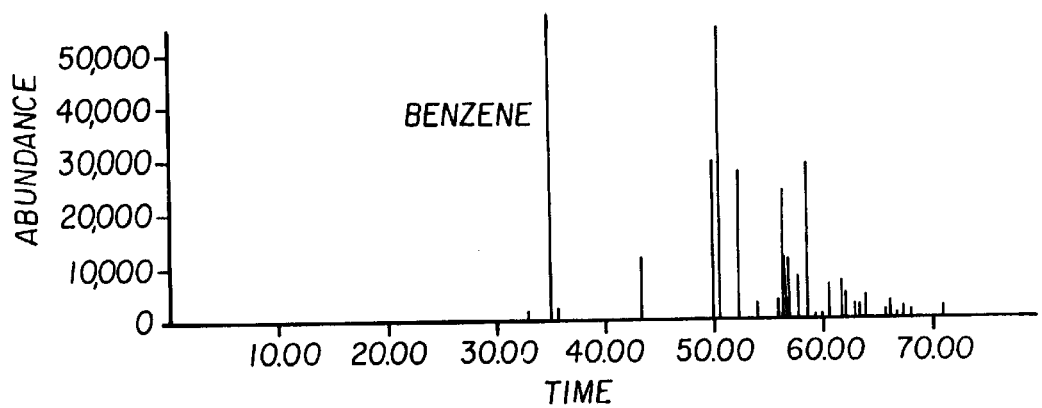
FIGS. 12A–12C show masses 77, 91 and 105, indicative of benzene, toluene, and xylene, respectively, for the treated Indolene.
Figure 12B:
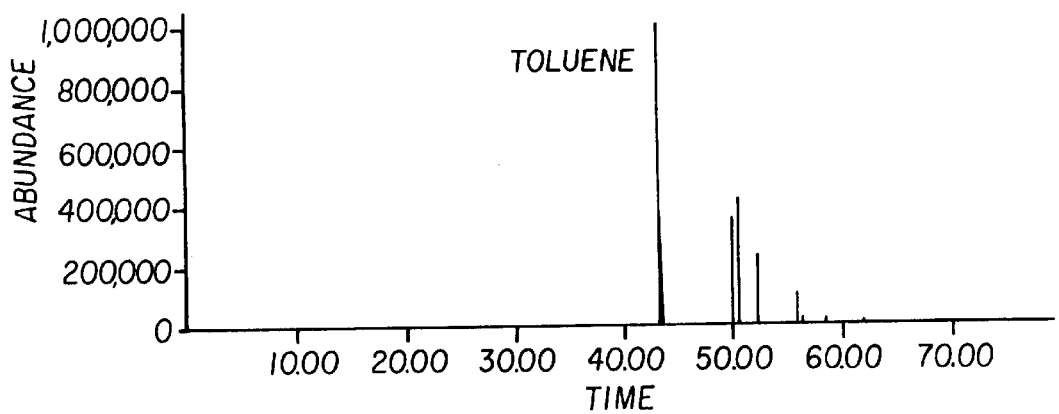
Figure 12C:
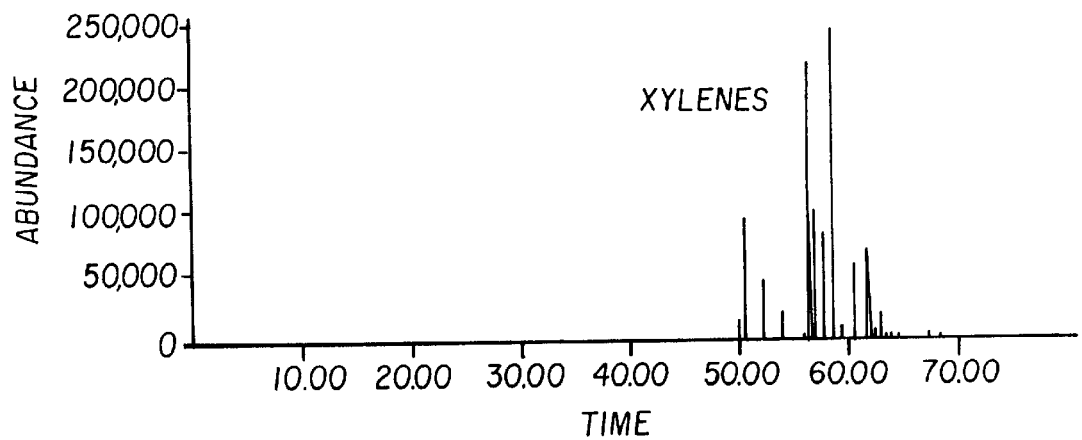
Figure 13A:
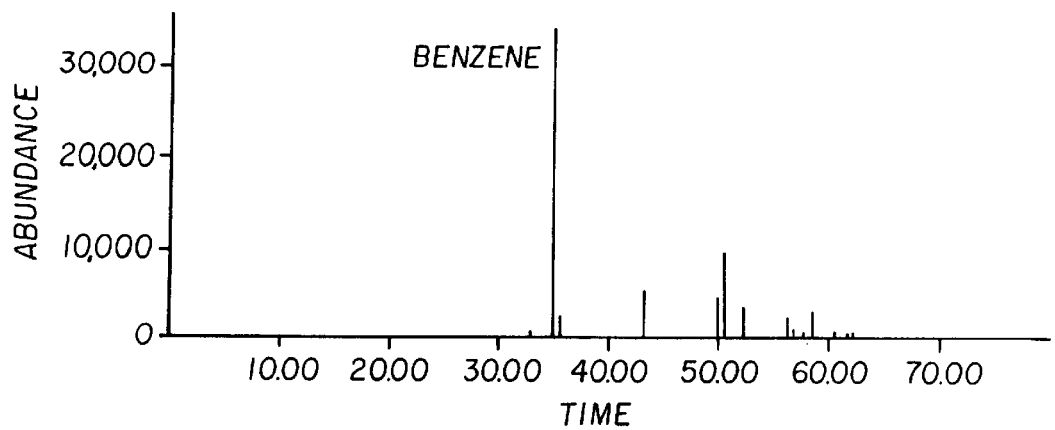
FIGS. 13A–13C show masses 77, 91 and 105, indicative of benzene, toluene, and xylene, respectively, for the untreated Indolene.
Figure 13B:
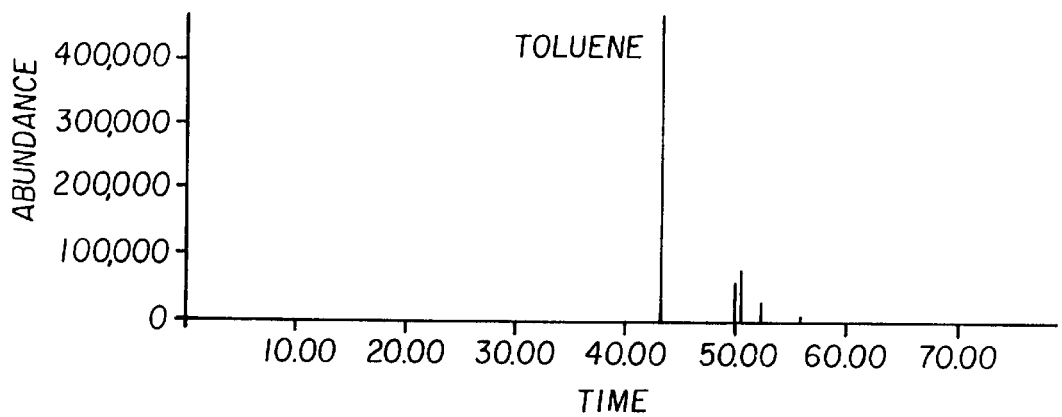
Figure 13C:
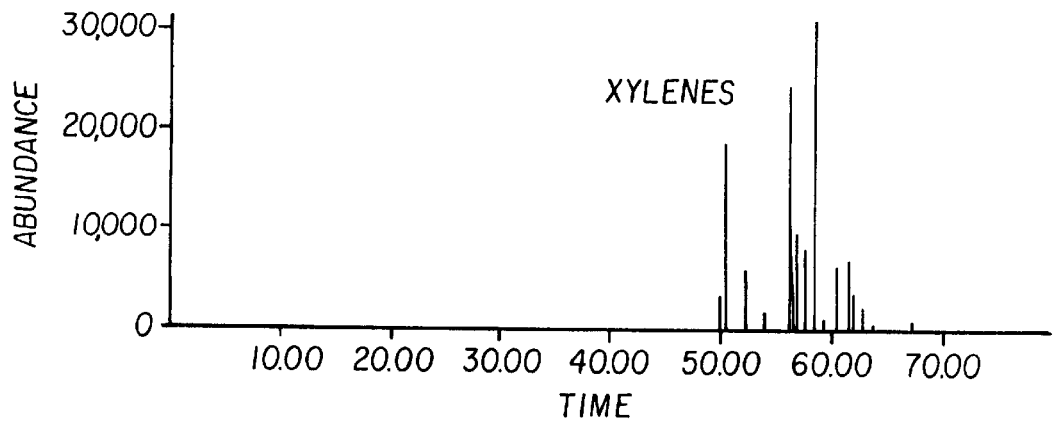
Figure 18:
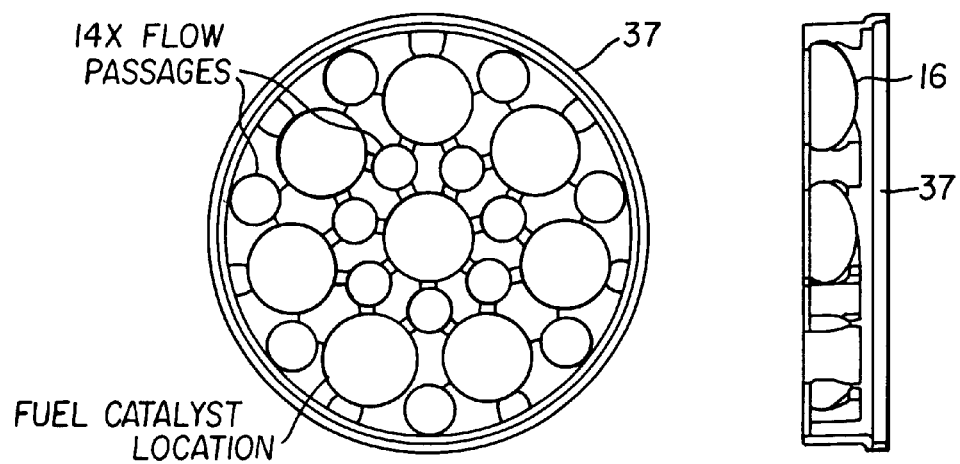
FIG. 18 is a front view of a fuel catalyst retainer incorporated in the fuel treatment device illustrated in FIG. 17.

In the case of gasoline, most of the change was observed in the region of the chromatogram from 40 to 80 minutes. This region of the chromatogram is where the compounds which increase the octane of gasoline elute. Results for saturated alkanes are shown in FIGS. 9A–9C and 10A–10C. Only those compounds with mass 57, 71, and 85, masses indicative of alkanes, are shown in FIGS. 9A–9C and 10A–10C. The treated gasoline has many more of these compounds in the higher boiling portion of the chromatogram, indicating that the catalyst elements form these compounds, most likely by cracking longer chain paraffins. Accordingly, the treated gas has much more octane, nonane and decane than the untreated gas, which would mean higher octane. Furthermore, FIG. 11 shows an annotated chromatogram of the 40–80 minute portion of the treated gasoline in FIG. 3. Whereas FIG. 4 shows almost no compounds eluting in this region, there are many which were tentatively identified in FIG. 11. These compounds are mostly aromatic in nature, meaning they are based on benzene. Thus, FIG. 18 shows toluene (methyl benzene), the xylenes, ethyl benzenes, and various isomers of $C_3$-benzene and $C_4$-benzene. The aromatic hydrocarbons have the most energy per unit carbon, and thus have the highest octane rating, so the catalyst treatment appears to increase octane and energy content of the gasoline by forming aromatic compounds. Although the exact source of these compounds could not be determined from this initial experimental analysis, they were believed to derive from asphaltenes (high molecular weight tars) and other polycyclic aromatic which contaminate all commercial gasolines. Accordingly, the net effect of the treatment of the fuel by the elements appeared to be the increase of high octane, high energy constituents in the gasoline.

Figure 7:
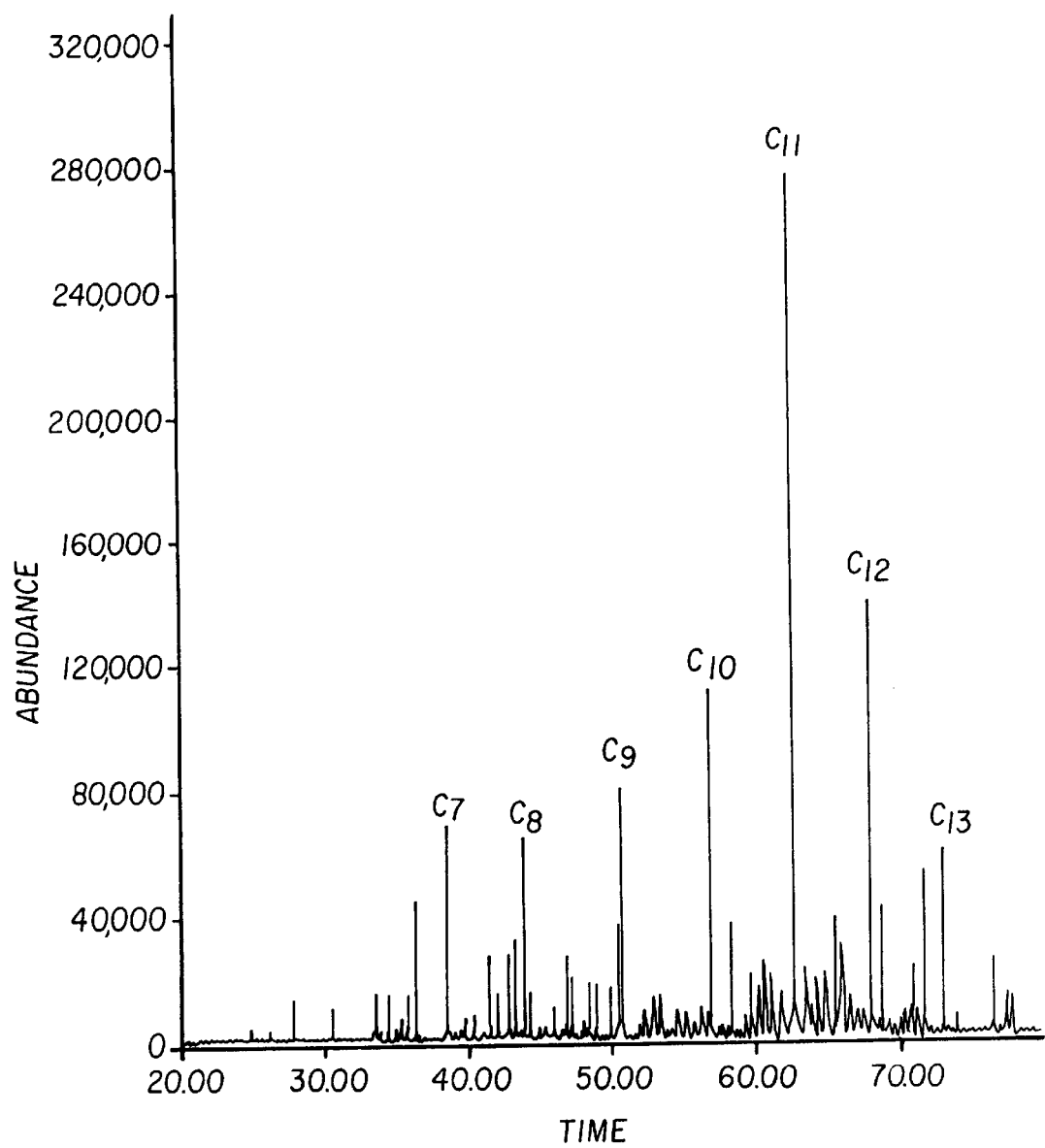
FIG. 7 is an ion chromatogram illustrating diesel fuel treated with the fuel catalyst of the invention.
Figure 8:
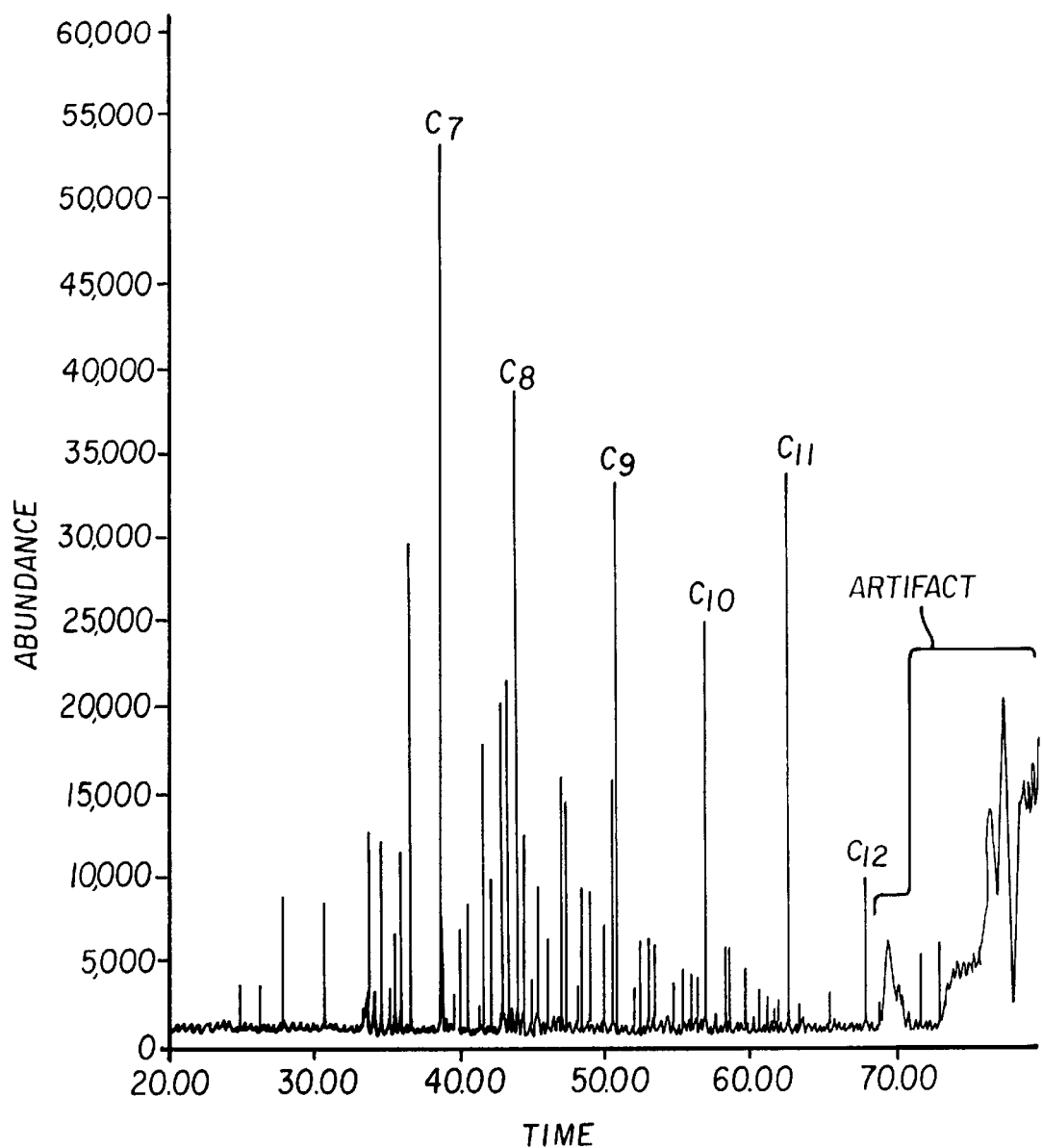
FIG. 8 is an ion chromatogram of untreated diesel fuel.
Figure 9A:
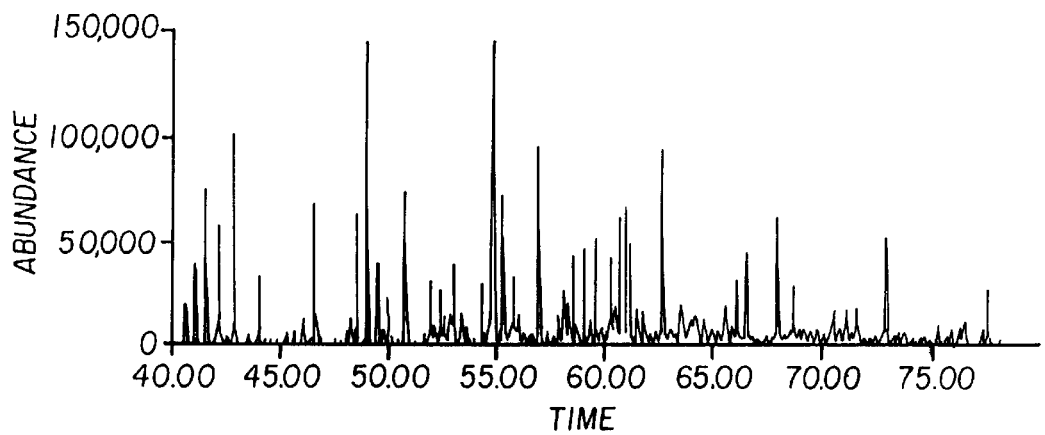
FIGS. 9A–9C illustrate an ion chromatogram for compounds with mass 57, 71 and 85 for treated gasoline.
Figure 9B:
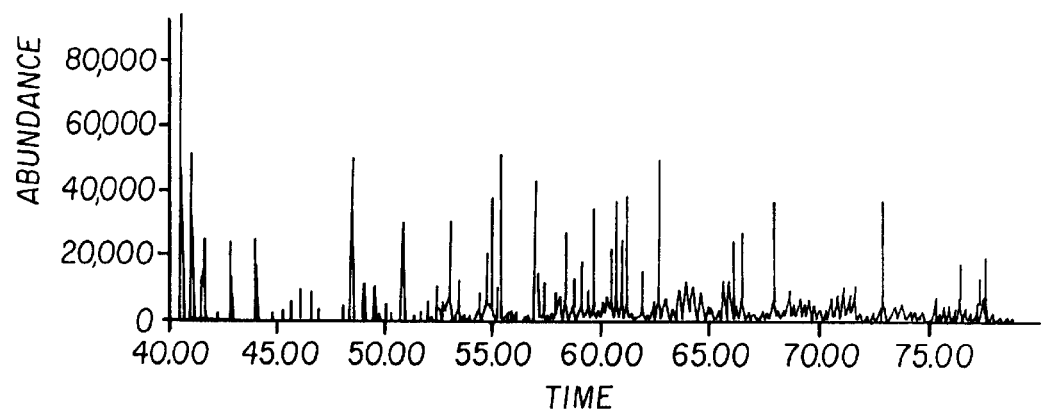
Figure 9C:
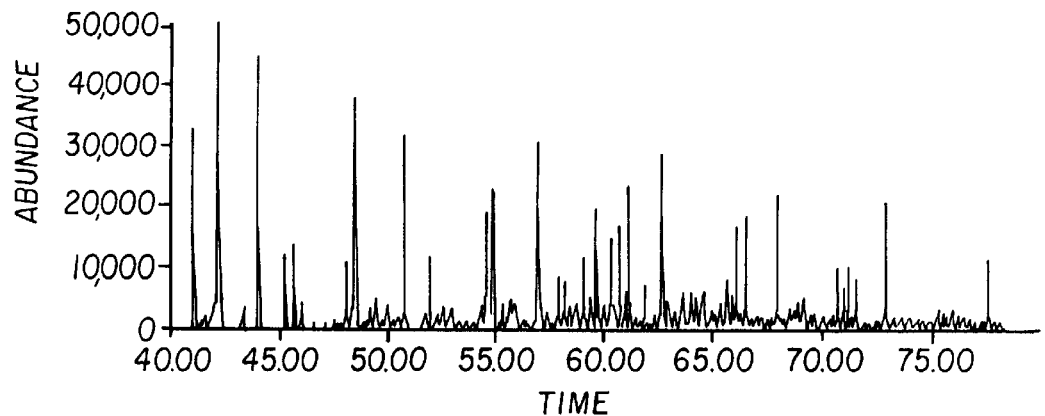
Figure 10A:
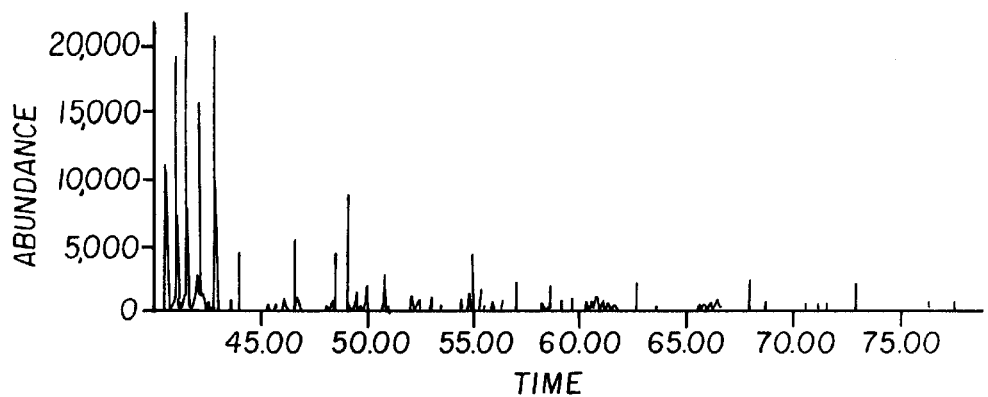
FIGS. 10A–10C illustrate an ion chromatogram for compounds with mass 57, 71 and 85 for untreated gasoline.
Figure 10B:
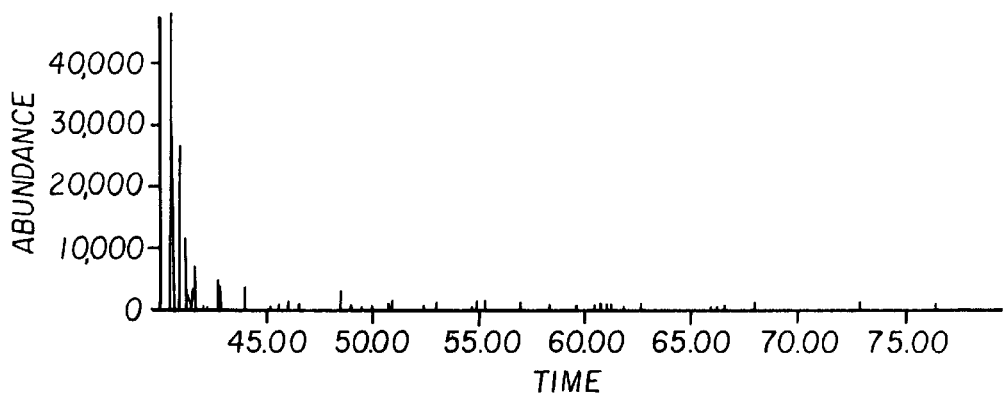
Figure 10C:
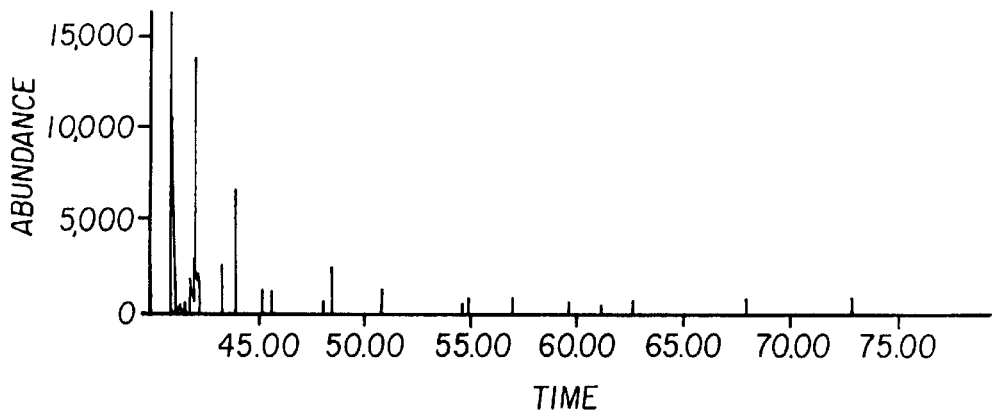

Changes were also observed between the treated and untreated Indolene. FIGS. 12A–12C and 13A–13C show masses 77, 91, and 105, indicative of benzene, toluene, and xylene, respectively, for the treated and untreated Indolene. The treated Indolene shows a much higher proportion of xylenes than the untreated fuel. It is believed that the $C_3$-benzenes and $C_4$-benzenes are being converted by the catalyst elements to these compounds. Diesel fuel is primarily made up of $C_8$ to $C_{18}$ saturated alkanes, with the bulk cut being between $C_{12}$ and $C_{16}$. The lighter ends lower the cetane number of diesel, and the heavier ends are not efficiently burned. FIGS. 7 and 9 are annotated to show the different C values. The addition of each carbon results in even spacing in time between peaks. The scale in FIG. 8 shows that the $C_7$, $C_8$, $C_9$, concentrations are about the same in the treated fuel illustrated in FIG. 7. The amount of $C_{10}$–$C_{12}$ is much greater in the treated fuel. Specifically an almost tenfold increase is observed. Thus, it appears that the catalyst elements are cracking the long-chain paraffins to form the lower molecular weight saturated alkanes. Aromatics are generally not very abundant in diesel, so the aromatic derivatives that showed up in the gasoline are absent. In addition to the above testing, fuel treatment devices in accordance with the invention have been certified by the United States Environmental Protection Agency as having satisfied all of the requirements of 40 C.F.R. §85.2114, based on tests conducted by various agencies which verified substantial decreases in hydrocarbon, carbon monoxide, oxides of nitrogen, carbon dioxide and fuel soot emissions. Further, tests conducted by the University of Pittsburgh Applied Research Center (Battery Technology Center) confirm that the elements 16 act as true catalysts and do not dissolve into the fuel being treated.

Accordingly, while the fuel catalyst has been proven effective by a variety of testing methods, the actual mechanism that allows the fuel catalyst to function in such a variety of chemically dissimilar fuels has not been understood. Accordingly, further improvements can only be obtained through empirical processes unless the basic underlying mechanism is identified. To this end, extensive study has been focused on gaining an understanding of the underlying mechanism so that further fuel catalysts could be developed using an analytical approach.

It is now believed that the basic underlying mechanism of the operation of the fuel catalyst lies in the liberation of hydrogen gas from the fuel through a catalytic action. The fuel catalyst described above utilizes antimony, tin, lead and mercury. Antimony and tin, in particular, act as hydride producers in protonic solvents. When acidic groups are present, the elements of the fuel catalyst act in a similar manner to an electrolysis cell. The elements act as a set of short-circuited galvanic cells, in which the one or more elements is a common anode (with a high overvoltage for hydrogen evolution) and one or more elements act as a cathode (with relatively low hydrogen overvoltages). Metal ions leave the common anode while hydrogen gas is evolved from the cathode.

In weak acid solutions, both antimony and tin produce hydrides Stibine ($SbH_3$) and Stannane ($SnH_4$) when a more active electrolytic element (less noble) and a less active electrolytic element (more noble), for example lead and mercury, are present. These hydrides are very unstable and decompose rapidly to produce hydrogen and the parent metal, especially in the presence of dissimilar metals. In hydrocarbon fuels, there are always acidic impurities and water, which is soluble to some extent in all fuels. These supply labile hydrogen ions to the fuel catalyst to allow the liberation of hydrogen in small and safe quantities. It is therefore believed that the hydrogen resulting from the catalytic action is responsible for improving the combustion process, allowing the improvements that have been observed in power, reduction of pollutants and particulates, and an increase in mileage.

Tests have been conducted to confirm hydrogen liberation through the catalytic reaction. Two milliliters of buffered hydrochloric acid was placed in a flask containing 200 ml ethanol and fuel catalyst elements. Resulting hydrogen gas was burned off by the application of a flame to a side arm of the flask.

While it has been known that the introduction of a relatively small amounts of hydrogen in hydrocarbon fuels can dramatically increase horsepower and reduce emissions of atmospheric pollutants, it has been difficult to find a safe and simple way of introducing hydrogen into the combustion process. Prior methods of utilizing electrolytic cells, where hydrogen is produced at the cathode, or tanks of compressed hydrogen gas, or palladium-hydrogen systems, where the correct application of heat drives off hydrogen gas, are complicated, bulky and cumbersome. In contrast, the use of the fuel catalyst to produce hydrogen as fuel flows over the catalyst is simple and safe. Utilizing the fuel catalyst, hydrogen is released in proportion to fuel flow.

In view of the above, it is now possible to analytically design fuel catalysts using hydride producing elements, for example, by utilizing hydride producing elements from Group IV and Group V of the periodic table in combination with elements that are more active and less active on the electrolytic scale. Accordingly, metals such as mercury and lead may be replaced with metals such as zinc, magnesium, aluminum, palladium, silver, copper and cerium. Using the above information, fuel catalyst elements having 40% wt zinc, 40% wt antimony, 18% wt tin and 2% wt silver were prepared using a smelting process. For example, the antimony, tin and silver are combined and melted in a crucible at a temperature of 1100–1200 degrees F. and stirred until completely alloyed. The zinc is then added to the mixture and it is either poured into molds and cast or dropped to form shot. The fuel catalyst was then compared with the fuel catalyst of U.S. Pat. No. 5,580,359 described above and a control using no fuel catalyst. Six independent runs were made for the control, the fuel catalyst of U.S. Pat. No. 5,580,359 and the analytically developed new fuel catalyst described above, while measurements of CO, $CO_2$, HC and $O_2$ were taken. The averaged results of the six runs are illustrated in Table 1.

TABLE 1

|  | CO | CO2 | HC | O2 |
|---|---|---|---|---|
| Mobil 87 Octane (No Catalyst) | 2.42 | 7.94 | 132 | 3.5 |
| Mobil 87 Octane ('359 Catalyst) | 1.14 | 8.90 | 77 | 3.1 |
| Mobil 87 Octane (new Catalyst) | 0.90 | 9.07 | 66 | 3.1 |

The test results indicated that the '359 fuel catalyst decreased carbon monoxide by 53% and hydrocarbons by 42%, while the analytically developed new fuel catalyst actually performed better by reducing carbon monoxide by 63% and hydrocarbons by 50%.

Based on the results obtained, it is believed that catalyst elements containing variations of 10–80% wt zinc, 20–60% wt antimony, 1–5% wt silver and 10–30% wt tin will yield beneficial results. Other combinations are also possible. A further preferred embodiment includes 0.1–1.0% wt palladium, 20–80% wt magnesium, 20–60% wt antimony, 10–30% wt tin and 1–8% wt cerium, with a further preferred embodiment within the above ranges includes 0.2% wt palladium, 30% wt magnesium, 40% wt antimony, 25% wt tin and 4.8% wt cerium. A still further embodiment includes 39% wt zinc, 11% wt aluminum, 25% wt tin and 25% wt antimony.

The interaction between the catalyst elements and the mild steel is not fully appreciated at this time. It is believed that the mild steel is also acting in combination with the catalyst elements as a material that is more active on the electrolytic scale. In order to avoid problems with corrosion of steel mesh, attempts were made to replace the steel screens with non-corrosive #316 stainless steel screens. It was found, however, that #316 stainless steel appeared to adversely impact the efficiency of the fuel catalyst. It was discovered, however, that an alloy of nickel and copper, for example Monel 400 could be successfully utilized in place of the mild steel. Other alloys may also be utilized including Monel 404, Monel 405 and Monel K500, as well as other types of alloys having equivalent properties. For example, brass, copper and alloys of copper and nickel are also suitable. In such cases, it is believed that the copper is acting in combination with the fuel catalyst elements as an element of greater activity on the electrolytic scale.

Depending on the formulation of fuel catalyst element chosen and its intended application, the use of a steel or alloy container or screens may not be required. For example, based on the acid test results provided above, the fuel catalyst alone is sufficient to cause the generation of hydrogen when combined with fuel. In fact, it appears to be an advantage of the invention that the fuel catalyst works in conjunction with the acid in the fuel, as the fuel catalyst actually works better for "dirty" fuels, i.e. acid containing, as compared with "clean" fuels. In certain applications, it may actually be desirable to add acid to the fuel to increase hydrogen production, either by treating the fuel in bulk or including an acid injecting mechanism within the combustion system.

Figure 14:
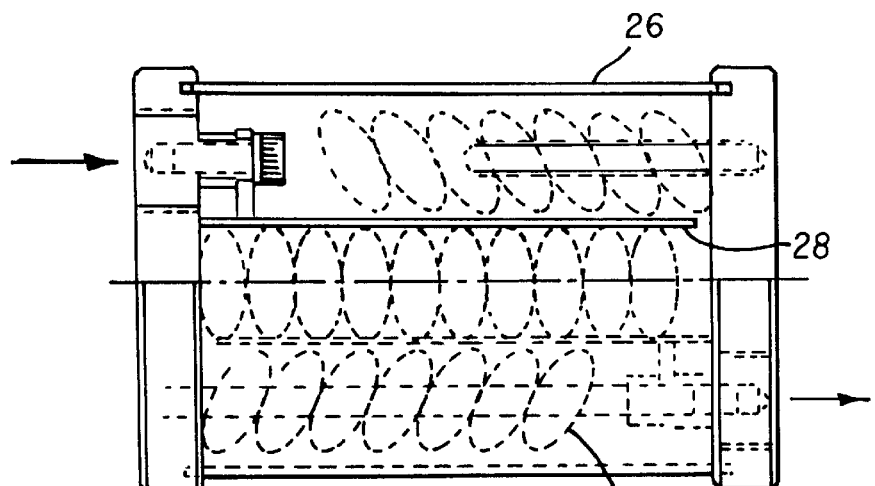
FIG. 14 is a longitudinal section through a fuel treatment device incorporating the fuel catalyst of the invention.
Figure 15:
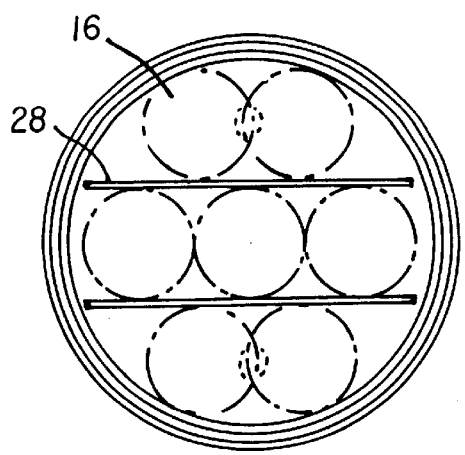
FIG. 15 is an end view of the device illustrated in FIG. 4 with an end cap removed.
Figure 16:
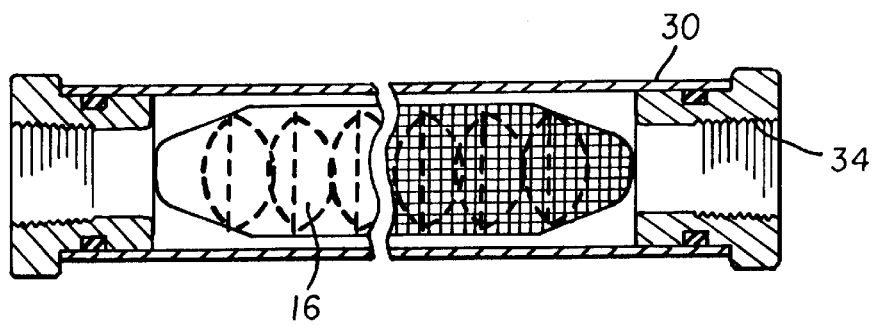
FIG. 16 is a longitudinal section through a further fuel treatment device incorporating the fuel catalyst of the invention.
Figure 17:
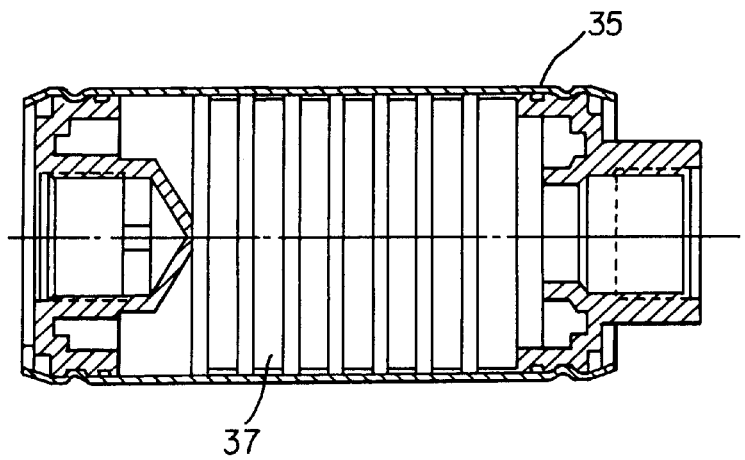
FIG. 17 is a longitudinal section through a still further fuel treatment device incorporating the fuel catalyst of the invention.
Figure 19:
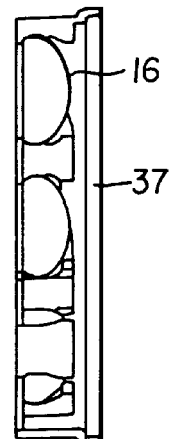
FIG. 19 is a side view of the fuel catalyst retainer of FIG. 18.

All of the above fuel catalyst elements may be incorporated into a plurality of different containers for treating fuel. FIGS. 14 and 15, for example, illustrate a further embodiment of an in-line housing 26 in which a plurality of catalyst elements 16 are separated into three levels by mild steel screens or separators 28. Further, FIG. 16 illustrates an in-line housing 30 wherein a plurality of elements 16 are retained within mild steel screen mesh retainer 32 located in the cylindrical housing 30 having threaded end caps 34. FIG. 17 illustrates an in-line housing 35 in which a plurality of elements 16 are retained in element spacers 37, of a type illustrated in FIGS. 18 and 19, in combination with Monel screens or washers.

Figure 20:
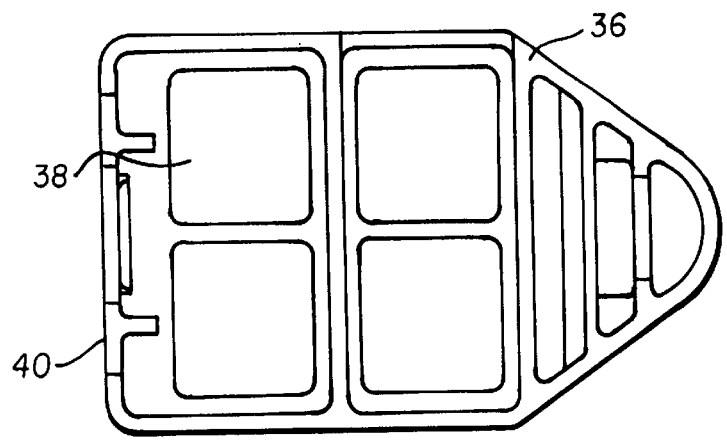
FIG. 20 is a top sectional view of a drop-in fuel treatment device.
Figure 21:
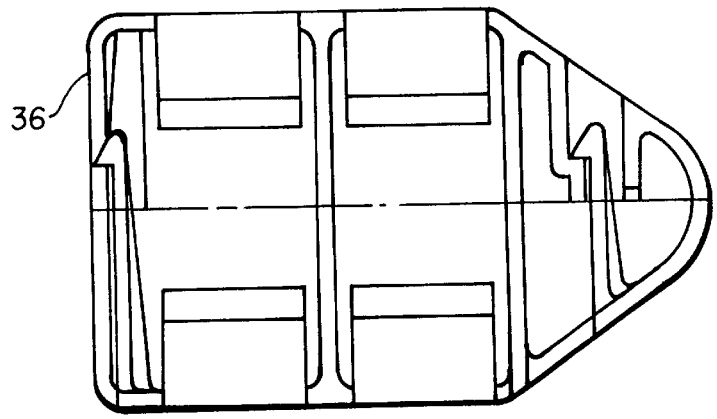
FIG. 21 is a side sectional view of the drop-in fuel treatment device of FIG. 20.
Figure 22:
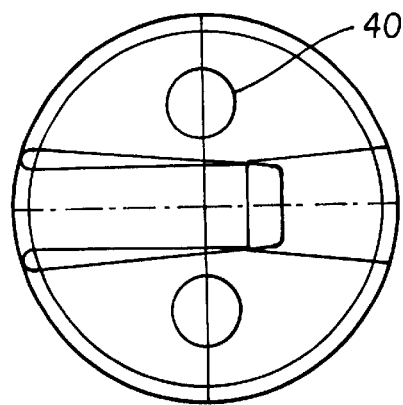
FIG. 22 is an end view of the drop-in fuel treatment device illustrated in FIGS. 20 & 21.

Still further, all of the above fuel catalyst elements may be incorporated into drop-in type housings. FIGS. 20–21 illustrate a drop-in housing or cage 36 comprising a snap-fit plastic container in which a plurality of elements 16 can be retained. Holes 38, 40 are provided in the housing 36 to permit fuel to pass through the housing 36 and contact the elements 16. The drop-in housing 36 is dropped into a steel fuel tank in order to treat fuel, and is particularly useful for small engine applications including, for example, lawn maintenance equipment. When the drop-in housing 36 is utilized in plastic fuel tanks, it is preferable that the housing be made of mild steel, Monel or an appropriate alloy or that screens be used to retain the elements.

The invention has been described with reference to certain preferred embodiments thereof. It will be understood, however, that modifications and variations are possible within the scope of the appended claims. For example, the catalyst element can be formed into any desired shape f or use within any desired type of housing. Alternatively, the catalyst element can be formed as a dry power or a semi-dry paste and poured directly into a fuel tank or formed as part of the fuel distribution system of a vehicle, burner, furnace or other combustion device. The housing or container retaining the elements may also be formed in any desired shape.

What is claimed is:

1. An apparatus for improving combustion efficiency comprising:

at least one catalyst element, wherein said catalyst element comprises 39% wt zinc, 11% wt aluminum, 25% wt tin and 25% wt antimony; and means for bringing fuel into contact with said catalyst element.

2. An apparatus as claimed in claim 1, wherein said means for bring fuel in contact with said catalyst element comprises an in-line housing including a fuel inlet and a fuel outlet.

3. An apparatus as claimed in claim 2, wherein a plurality of catalyst elements are provided within the housing.

4. An apparatus as claimed in claim 3, wherein the plurality of elements are arranged in at least one of a straight line, multiple sets arranged in a straight line, and multiple levels.

5. An apparatus as claimed in claim 1, wherein said means for bringing fuel into contact with said catalyst element comprises a drop-in housing.

6. An apparatus as claimed in claim 5, wherein a plurality of catalyst elements are arranged in the drop-in housing.

7. A method of improving the efficiency of fuel combustion comprising: bringing a fuel in contact with a catalyst element, wherein said catalyst element comprises 39% wt zinc, 11% wt aluminum, 25% wt tin and 25% wt antimony; and burning the fuel in a combustion process.

* * * * *